(12) United States Patent
Grip et al.

(10) Patent No.: US 8,072,502 B2
(45) Date of Patent: Dec. 6, 2011

(54) MULTI-MEGA PIXEL RESOLUTION WITH SMALL SENSOR

(75) Inventors: Stip Martin Grip, Malmö (SE); Alexander Hunt, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 642 days.

(21) Appl. No.: 11/298,584

(22) Filed: Dec. 12, 2005

(65) Prior Publication Data
US 2007/0132857 A1    Jun. 14, 2007

(51) Int. Cl.
H04N 5/225    (2006.01)
H04N 5/228    (2006.01)
G02B 26/12    (2006.01)

(52) U.S. Cl. ............... 348/218.1; 348/219.1; 348/222.1; 359/210.1

(58) Field of Classification Search ............... 348/218.1, 348/369, 219.11, 36–39, 293, 219, 208.7, 348/222, 272, 219.1; 359/210.1
See application file for complete search history.

(56) References Cited

U.S. PATENT DOCUMENTS

| | | | |
|---|---|---|---|
| 4,581,649 A | | 4/1986 | Morokawa .................... 358/212 |
| 5,142,357 A | * | 8/1992 | Lipton et al. .................... 348/48 |
| 5,227,888 A | | 7/1993 | Haga ........................ 358/213.28 |
| 5,400,070 A | * | 3/1995 | Johnson et al. ............. 348/219.1 |
| 5,402,171 A | * | 3/1995 | Tagami et al. ............. 348/219.1 |
| 5,644,139 A | * | 7/1997 | Allen et al. .................... 250/557 |
| 5,880,778 A | * | 3/1999 | Akagi ........................ 348/218.1 |
| 5,889,553 A | * | 3/1999 | Kino et al. .................. 348/218.1 |
| 6,153,991 A | * | 11/2000 | Burov et al. ................... 310/320 |
| 6,195,125 B1 | * | 2/2001 | Udagawa et al. .......... 348/222.1 |
| 6,577,341 B1 | * | 6/2003 | Yamada et al. ............... 348/272 |
| 6,606,202 B2 | * | 8/2003 | Hoshi .......................... 359/687 |
| 6,639,625 B1 | * | 10/2003 | Ishida et al. ............... 348/218.1 |
| 6,678,000 B1 | * | 1/2004 | Sakata ......................... 348/369 |
| 6,904,183 B2 | * | 6/2005 | Slatter ......................... 382/284 |
| 7,123,292 B1 | * | 10/2006 | Seeger et al. ............. 348/218.1 |
| 7,136,096 B1 | * | 11/2006 | Yamagishi et al. ........ 348/218.1 |
| 7,286,104 B2 | * | 10/2007 | Sempel et al. .................. 345/77 |
| 7,307,653 B2 | * | 12/2007 | Dutta .......................... 348/208.7 |
| 2002/0054217 A1 | | 5/2002 | Matsuda et al. .............. 348/218 |
| 2002/0126210 A1 | * | 9/2002 | Shinohara et al. ............ 348/219 |
| 2003/0123714 A1 | * | 7/2003 | O'Gorman et al. ........... 382/124 |

(Continued)

FOREIGN PATENT DOCUMENTS

EP    0 748 108 A2    12/1996
JP    2003331269 A  *  11/2003

(Continued)

OTHER PUBLICATIONS

International Search Report for corresponding PCT application with a mailing date of Oct. 2, 2006; 4 pages.

(Continued)

*Primary Examiner* — Lin Ye
*Assistant Examiner* — Mekonnen Dagnew
(74) *Attorney, Agent, or Firm* — Snyder, Clarkm, Lesch & Chung, LLP (57) ABSTRACT

A camera device includes optics to produce a projected image, where the projected image has a projected image area. The camera device also includes a moveable sensor to move to a number of positions within the projected image area and capture a portion of the projected image, as an image portion, in each of the positions, and processing logic to combine the image portions together into a final image.

18 Claims, 11 Drawing Sheets

U.S. PATENT DOCUMENTS

2004/0136612 A1     7/2004     Meister et al. ............... 382/299
2006/0103735 A1*     5/2006     Yang et al. ............... 348/218.1
2007/0097219 A1*     5/2007     Nomura et al. ............ 348/208.7

FOREIGN PATENT DOCUMENTS

WO     WO 00/36897     6/2000

OTHER PUBLICATIONS

Bob Atkins; "Digital Cameras—a Beginner's Guide"; http://www.photo.net; Dec. 5, 2005 (print date); 11 pages.

Tracy V. Wilson et al.; "How Digital Cameras Work"; http://electronics.howstuffworks.com; Dec. 5, 2005 (print date).

"Tutorials: Digital Camera Sensors"; http://www.cambridgeincolour.com; Dec. 5, 2005 (print date); 4 pages.

Konica Minolta; "Piezoelectric Ultrasonic Linear Actuator"; http://konicaminolta.com; Dec. 2, 2005 (print date); 3 pages.

"Digital Camera Sensor Sizes: How it Influences Your Photography"; http://www.cambridgeincolour.com; Dec. 5, 2005 (print date); 9 pages.

* cited by examiner

MULTI-MEGA PIXEL RESOLUTION WITH SMALL SENSOR

TECHNICAL FIELD OF THE INVENTION

Implementations described herein relate generally to image capturing and, more particularly, to a camera device that can capture multi-mega pixel resolution images using a small sensor with low resolution.

DESCRIPTION OF RELATED ART

The current trend in the camera market is to include more pixels on the camera sensors. By increasing the number of pixels, the design and manufacture of the camera sensors becomes more complex and expensive. The more pixels on the camera sensor, the higher probability for errors to occur in production. As a result, production yield decreases and prices increase.

SUMMARY

According to one aspect, a camera device may comprise optics to produce a projected image, a moveable sensor with a first number of pixels to capture a plurality of portions of the projected image, and processing logic to combine the plurality of portions into an image that contains a second number of pixels at least approximately two times greater than the first number of pixels.

Additionally, the camera device may further comprise a movement mechanism to move the sensor to a plurality of locations.

Additionally, the movement mechanism may include a piezoelectric actuator.

Additionally, the sensor may be configured to capture an image portion at each of the locations.

Additionally, the processing logic may be configured to combine the image portions to create the image.

Additionally, the size of the sensor may be smaller than a size of the projected image.

Additionally, the projected image may have a projected image area and the sensor may be configured to move to a plurality of locations in the x-direction and the y-direction within the projected image area.

Additionally, each of the plurality of portions may overlap with another one of the plurality of portions.

According to another aspect, a camera device may comprise optics to produce a projected image, the projected image having a projected image area; a moveable sensor to move to a plurality of positions within the projected image area and capture a portion of the projected image, as an image portion, in each of the positions; and processing logic to combine the image portions together into a final image.

Additionally, the number of pixels associated with the sensor may be less than a number of pixels associated with the final image.

Additionally, the camera device may further comprise a movement mechanism to move the sensor to each of the plurality of positions.

Additionally, the movement mechanism may include a piezoelectric actuator.

Additionally, the sensor may be configured to move to a plurality of locations in the x-direction and the y-direction within the projected image area.

Additionally, each of the image portions may overlap with another one of the image portions.

According to yet another aspect, a camera device may comprise a plurality of lens elements configured to project an image associated with a field of view; a sensor to capture a plurality of sub-images associated with the field of view by moving one or more of the lens elements or moving the sensor; and processing logic to combine the sub-images to obtain a final image associated with the field of view.

Additionally, the camera device may further comprise a movement mechanism to move the one or more lens elements or the sensor to a plurality of locations.

Additionally, the movement mechanism may include a piezoelectric actuator.

Additionally, the number of pixels on the sensor may be at least approximately two times less than a number of pixels associated with the final image.

Additionally, the sensor may include a plurality of sensors.

According to a further aspect, a method, performed by a camera device that includes a plurality of lens elements and a sensor, may comprise projecting an image; capturing a plurality of sub-images associated with the image by moving at least one of one or more of the lens elements or the sensor; and combining the sub-images into a final image.

According to another aspect, a device may comprise means for projecting an image, the projected image having a projected image area; means for moving a sensor to a plurality of positions within the projected image area; means for capturing, by the sensor, a portion of the projected image, as an image portion, in each of the positions; and means for merging the image portions into a final image.

Additionally, the number of pixels on the sensor may be at least approximately two times less than a number of pixels associated with the final image.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF EMBODIMENTS

The following detailed description of the invention refers to the accompanying drawings. The same reference numbers in different drawings may identify the same or similar elements. Also, the following detailed description does not limit the invention.

The description to follow will describe a camera device, such as a standalone digital camera or a digital camera implemented within another device, such as a cordless, wireless, or cellular telephone, personal digital assistant (PDA), communicator, computer device, or another type of device that may include a camera.

EXEMPLARY CAMERA DEVICE

Figure 1:
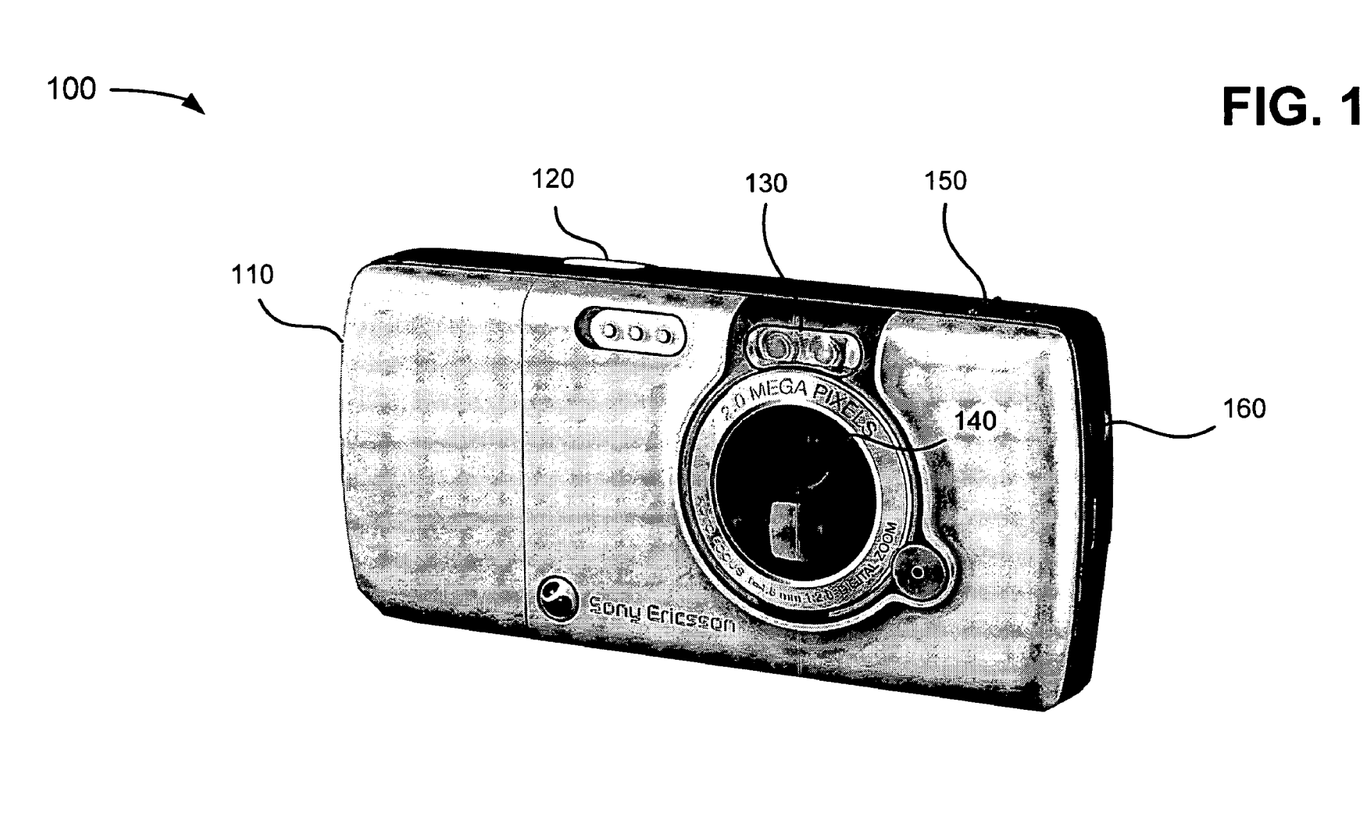
FIG. 1 is a diagram of an exemplary camera device according to an implementation consistent with the principles of the invention.

FIG. 1 is a diagram of an exemplary camera device 100 according to an implementation consistent with the principles of the invention. As shown in FIG. 1, camera device 100 may include a housing 110, a shutter button 120, a flash 130, a lens 140, a zoom button 150, and a power button 160.

Housing 110 may protect the components of camera device 100 from outside elements. Shutter button 120 may permit a user to take a picture. When selected by a user, shutter button 120 may cause an image to be captured. Flash 130 may emit a short burst of bright light, if necessary, when the user releases shutter button 120. The burst of light from flash 130 may illuminate the field of view for a fraction of a second as the picture is taken.

Lens 140 may focus light onto a point. A camera lens may include several lens elements made of different materials. The lens elements may handle colors differently, and when combined in a certain way, can realign the colors. Sometimes, a camera lens may operate as a zoom lens, where individual lens elements can be moved back and forth. By changing the distance between particular lens elements, the magnification power (i.e., the focal length) of the lens as a whole can be adjusted.

Zoom button 150 may permit the user to change the distance between particular lens elements of lens 140 and, thus, zoom in and out on a particular object. Power button 160 may permit the components of camera device 100 to be powered on and off.

Figure 2:
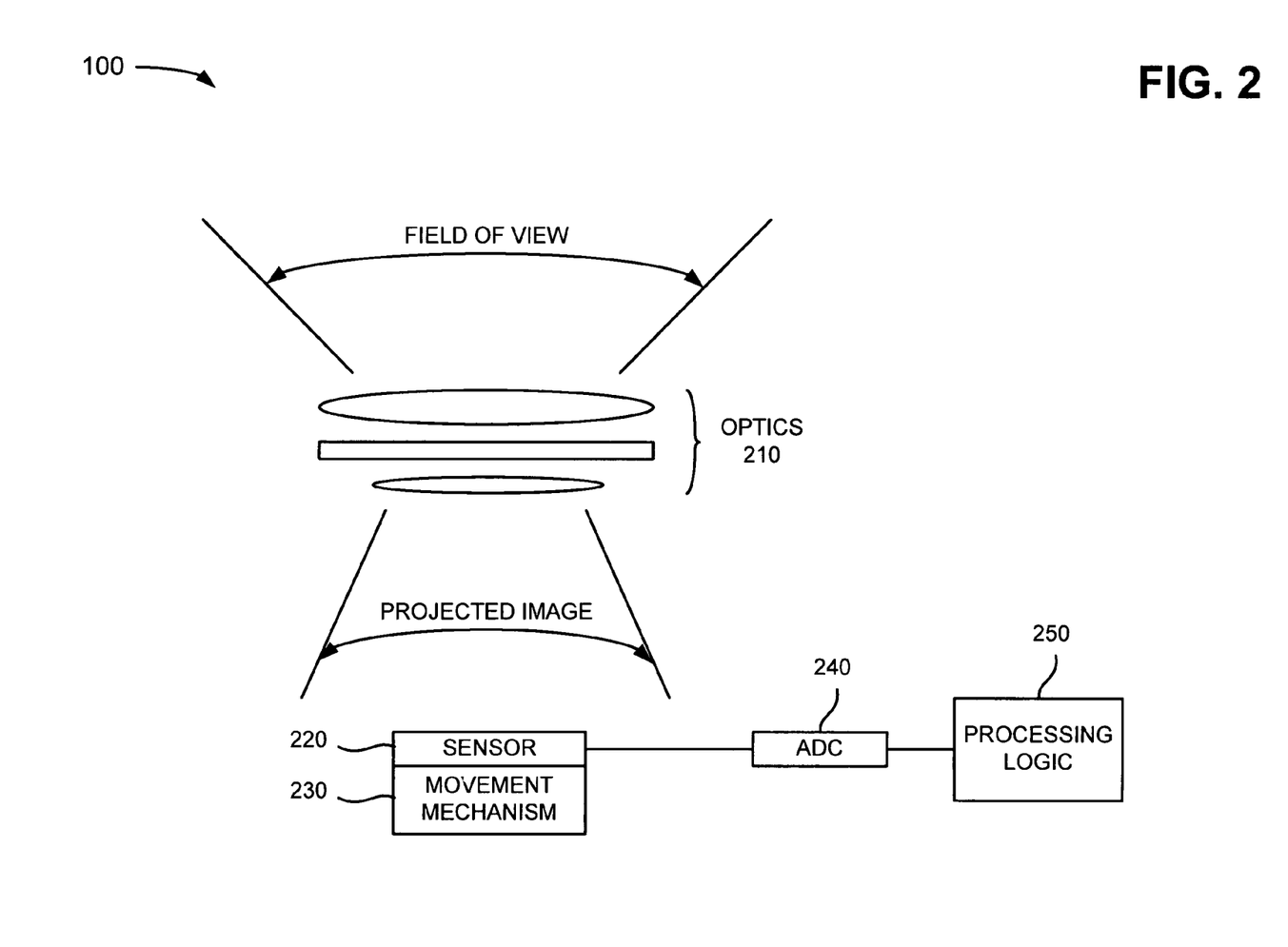
FIG. 2 is an exemplary diagram of some of the components of the camera device of FIG. 1.

FIG. 2 is an exemplary diagram of some of the components of camera device 100. As shown in FIG. 2, camera device 100 may include optics 210, sensor 220, movement mechanism 230, analog-to-digital converter (ADC) 240, and processing logic 250. Optics 210 may include the lens elements of lens 140. Optics 210 may obtain light from a field of view and focus it as a projected image. In one implementation, as described below, the projected image is larger than the size of sensor 220.

Sensor 220 may include a sensor array of pixels. In an implementation described herein, sensor 220 may include fewer pixels than the final image resolution output by camera device 100. In one implementation, sensor 220 may include a charge coupled device (CCD) or complementary metal oxide semiconductor (CMOS) technology. Both CCD and CMOS image sensors convert light into electrons. Once sensor 220 converts the light into electrons, it may read the value (i.e., accumulated charge) of each pixel in the image. A CCD sensor may transport the charge across the device and read it at one corner of the device. ADC 240 may then turn each pixel's value into a digital value. A CMOS sensor may use several transistors at each pixel to amplify and move the charge via wires. The output of a CMOS sensor is digital, so ADC 240 may not be needed.

Figure 3:
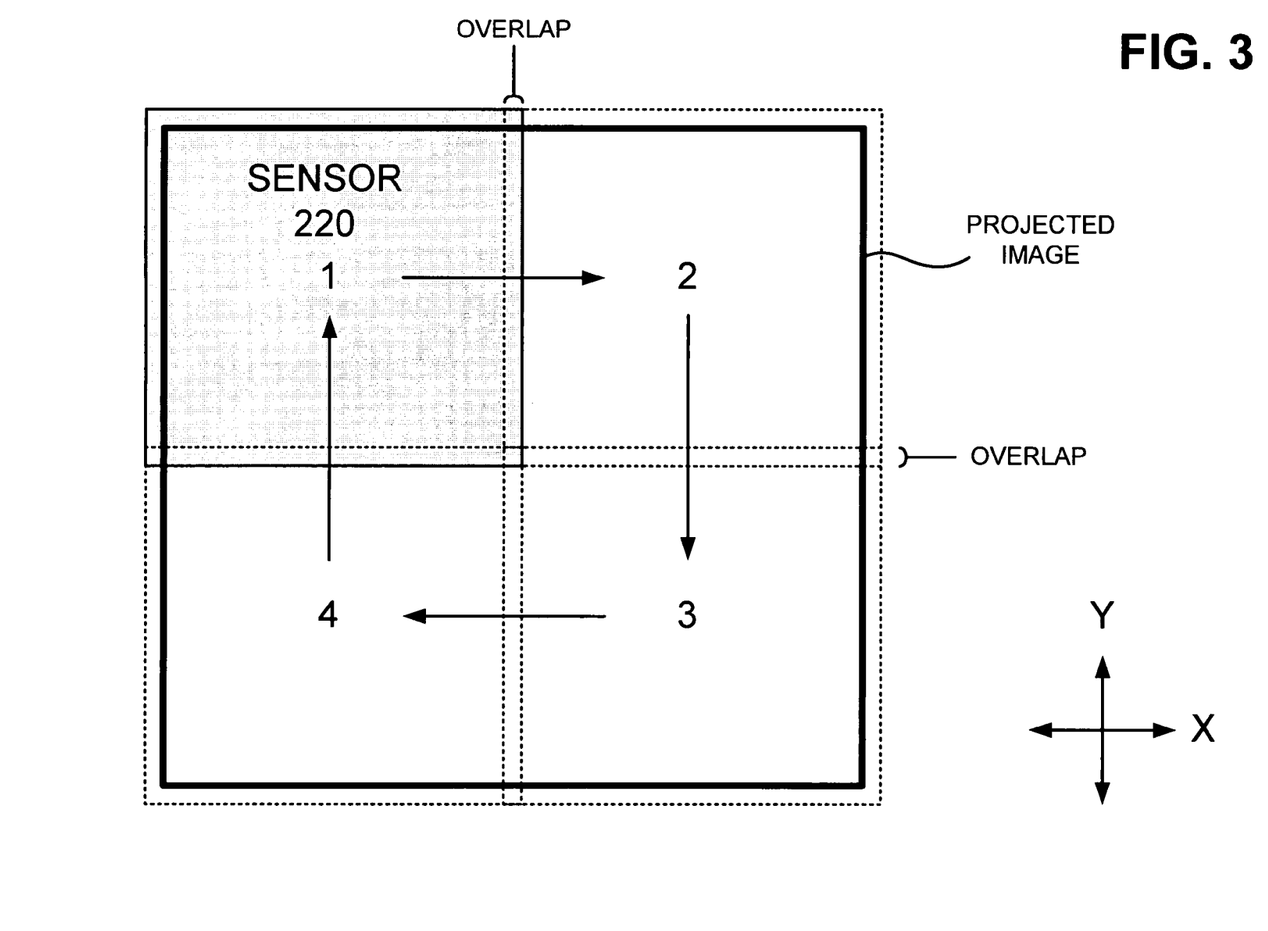
FIG. 3 is an exemplary diagram of possible sensor movement within the projected image of FIG. 2.

Movement mechanism 230 may include mechanisms to move sensor 220 in the x-direction and/or y-direction. In one implementation, movement mechanism 230 may include a piezoelectric linear actuator or another type of micro mechanics that is small in size and capable of moving sensor 220 at fast speeds. FIG. 3 is an exemplary diagram of possible sensor movement within the projected image. Sensor 220 may move in the x-direction and/or y-direction to cover the projected image. Assume that the projected image covers an area of approximately 6 mm by 6 mm and sensor 220 is approximately 3 mm by 3 mm. As shown in FIG. 3, sensor 220 may move from position 1 to position 2, from position 2 to position 3, and from position 3 to position 4 to cover the area of the projected image. In another implementation, sensor 220 may move in a different direction to more, fewer, or the same number of positions. The number of positions to which sensor 220 moves may be dependent on the size of sensor 220 and the size of the area of the projected image.

As shown in FIG. 3, there may be some overlap in the images captured by sensor 220 in the different positions. The overlap may be beneficial to ensure that the entire image of the projected image is captured by sensor 220 as sensor 220 moves to the different positions. The amount of overlap is a design decision. The more overlap, the more redundancy in the captured images. The less overlap, the greater the chance of not capturing a portion of the projected image.

Returning to FIG. 2, ADC 240 may be used if sensor 220 does not output a digital signal. In this case, ADC 240 may convert each pixel's value into a digital value by, for example, measuring the amount of charge at each pixel and converting that measurement to binary form.

Processing logic 250 may include a processor, microprocessor, application specific integrated circuit (ASIC), field programmable gate array (FPGA), or the like. Processing logic 250 may include storage for data structures or software programs to control operation of camera device 100 and its components. The storage may include a random access memory (RAM), a read only memory (ROM), and/or another type of memory to store data and instructions that may be used by processing logic 250.

As will be described in detail below, camera device 100, consistent with the principles of the invention, may perform certain image capturing operations. Camera device 100 may perform at least some of these operations in response to processing logic 250 executing software instructions contained in a computer-readable medium. A computer-readable medium may be defined as a physical or logical memory device and/or carrier wave.

The software instructions may be read into storage from another computer-readable medium or from another device. The software instructions contained in storage may cause processing logic 250 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

EXEMPLARY PROCESSING

Figure 4:
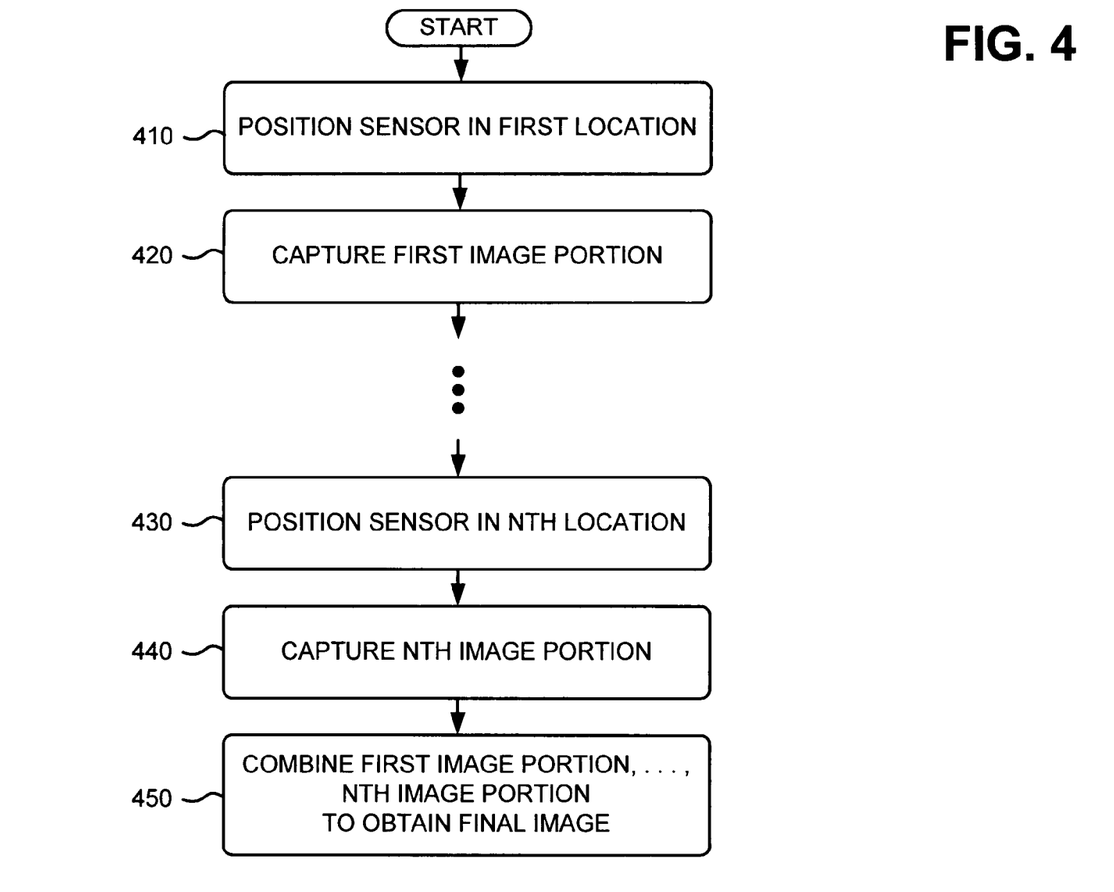
FIG. 4 is a flowchart of exemplary processing for obtaining a high resolution image.

FIG. 4 is a flowchart of exemplary processing for obtaining a high resolution image. FIGS. 5A-5E are diagrams that facilitate description of the processing of FIG. 4. Processing may begin with camera device 100 receiving an instruction to take a picture. The instruction may correspond to a user pushing shutter button 120 (FIG. 1) of camera device 100. The instruction may cause optics 210 of camera device 100 to project an image (i.e., a projected image) toward sensor 220.

Figure 5A:
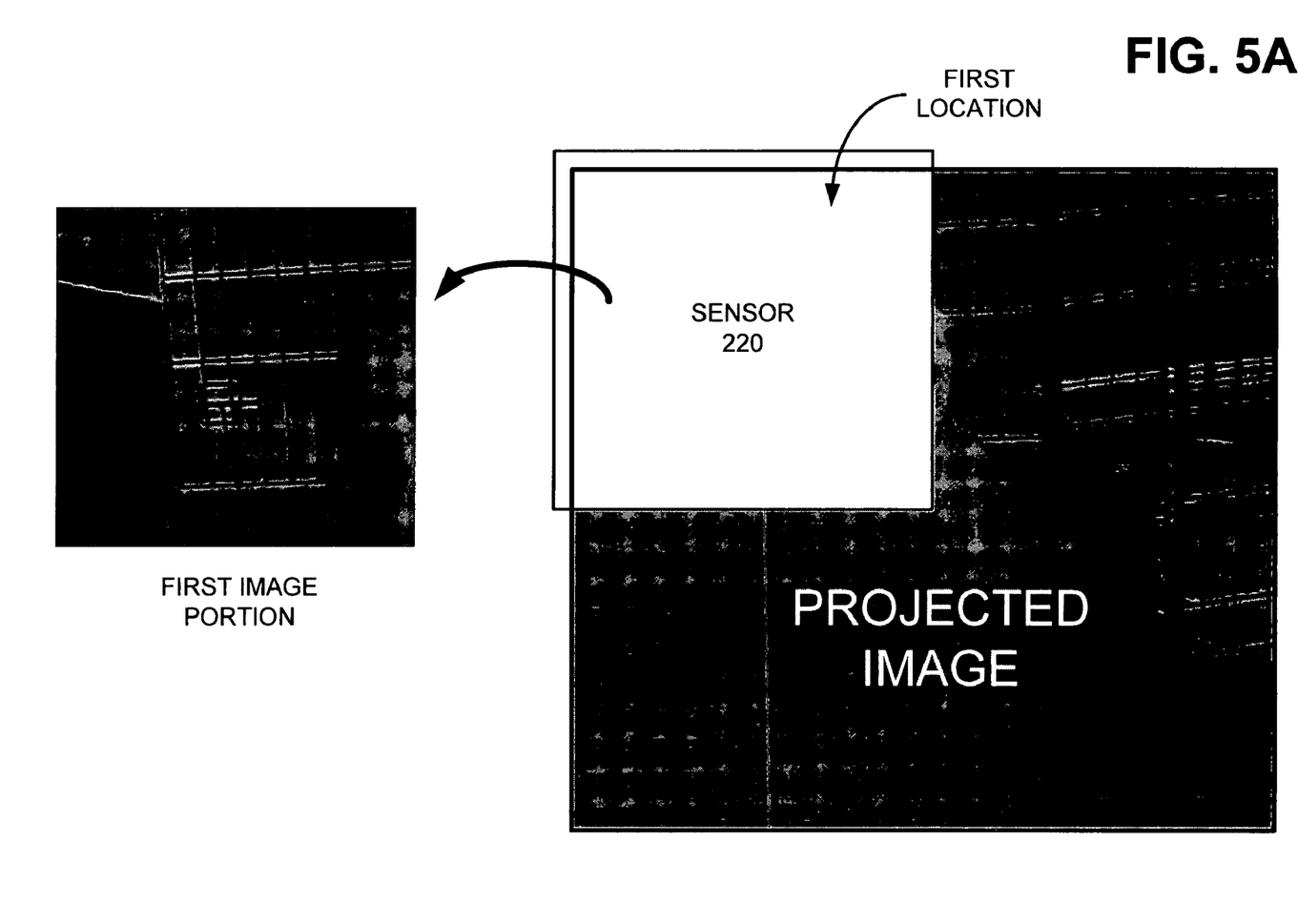
FIGS. 5A-5E are diagrams that facilitate description of the processing of FIG. 4.

Sensor 220 may be positioned in a first location (block 410). Assume that sensor 220 is approximately a quarter of the size of the projected image. As shown in FIG. 5A, the first location may correspond to the upper left hand corner of the projected image.

In the first location, sensor 220 may capture a first image portion that may correspond to a fraction of the projected image (block 420). Sensor 220 may use conventional techniques to capture the first image portion. As shown in FIG. 5A, the first image portion may correspond to the upper left hand corner of the projected image.

Figure 5B:
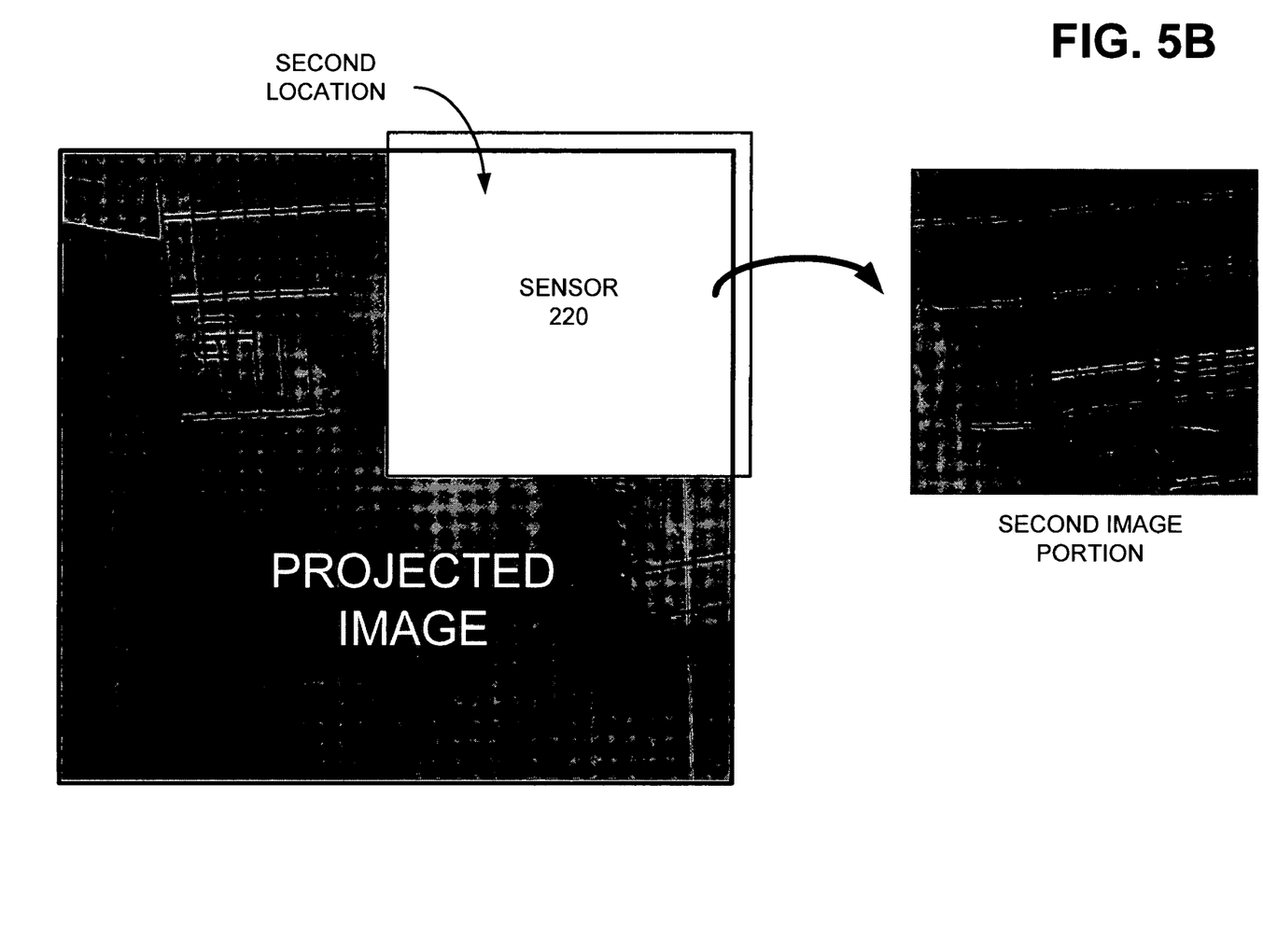
Figure 5C:
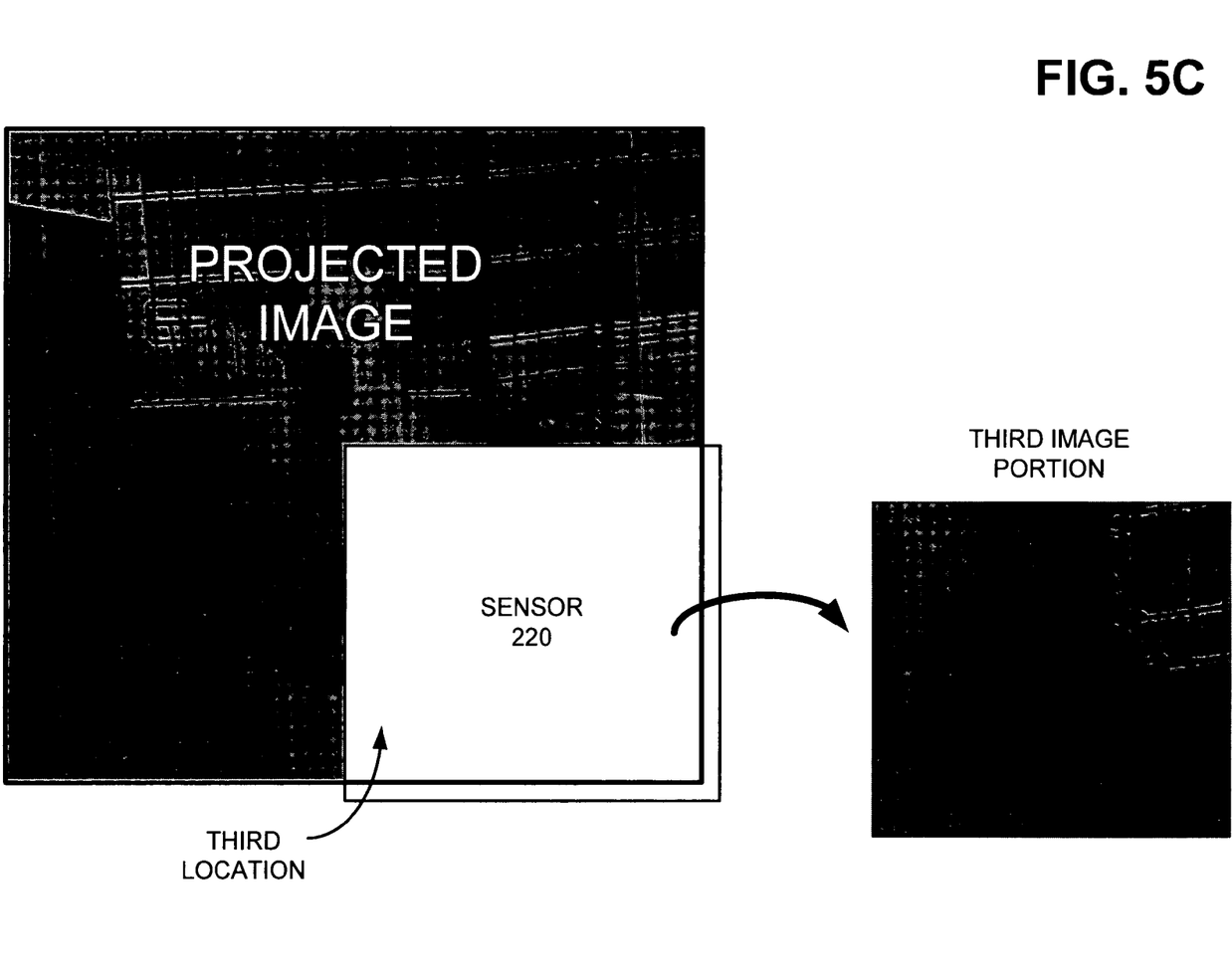
Figure 5D:
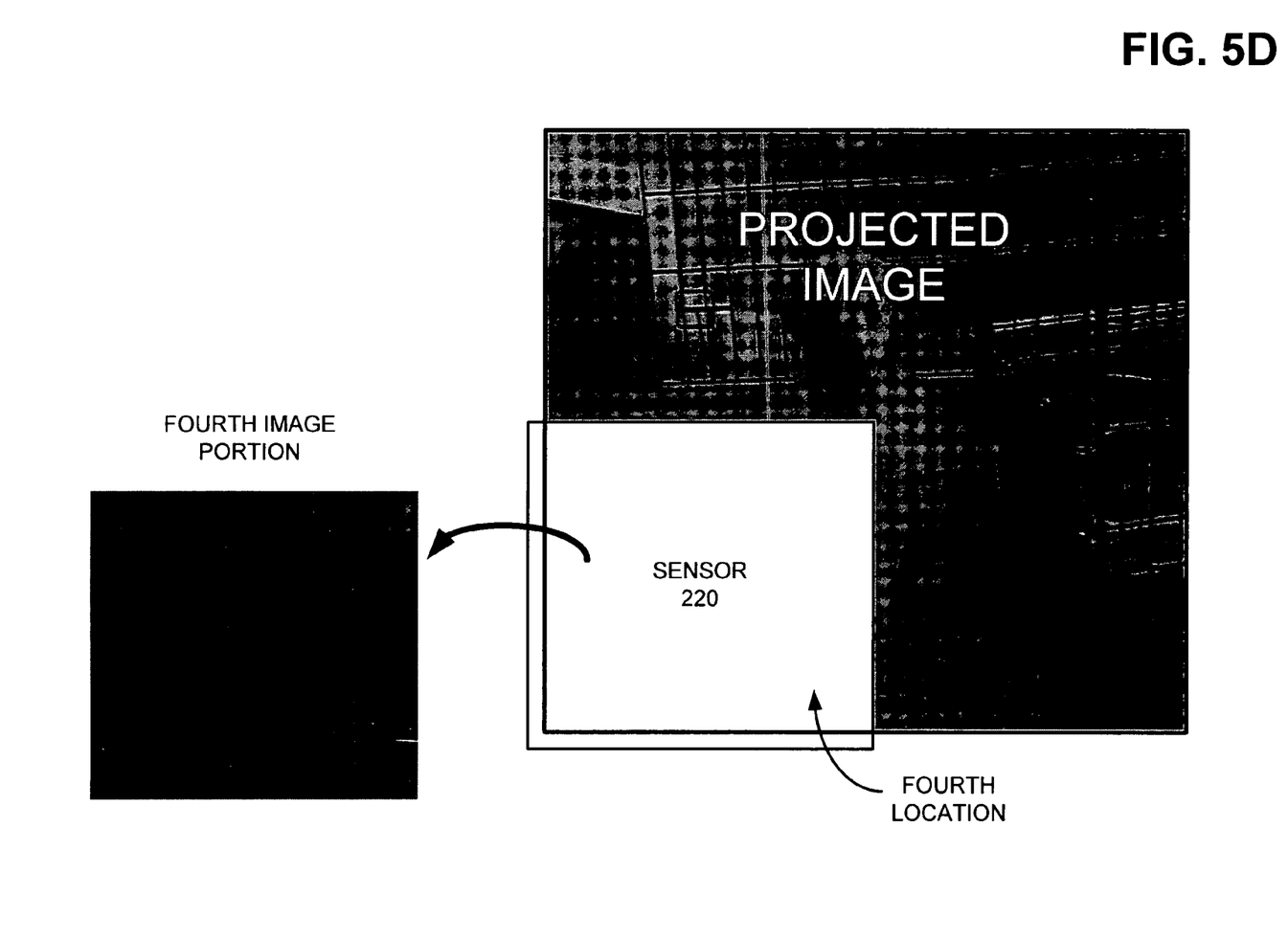

Sensor 220 may eventually be moved to an Nth (where N>1) location to capture an Nth image portion of the projected image (blocks 430 and 440). In the case where N=4, sensor 220 may be successively moved to a second location, a third location, and a fourth location to capture a second image portion, a third image portion, and a fourth image portion, respectively. As shown in FIG. 5B, the second image portion may correspond to the upper right hand corner of the projected image. As shown in FIG. 5C, the third image portion may correspond to the lower right hand corner of the projected image. As shown in FIG. 5D, the fourth image portion may correspond to the lower left hand corner of the projected image.

Figure 5E:
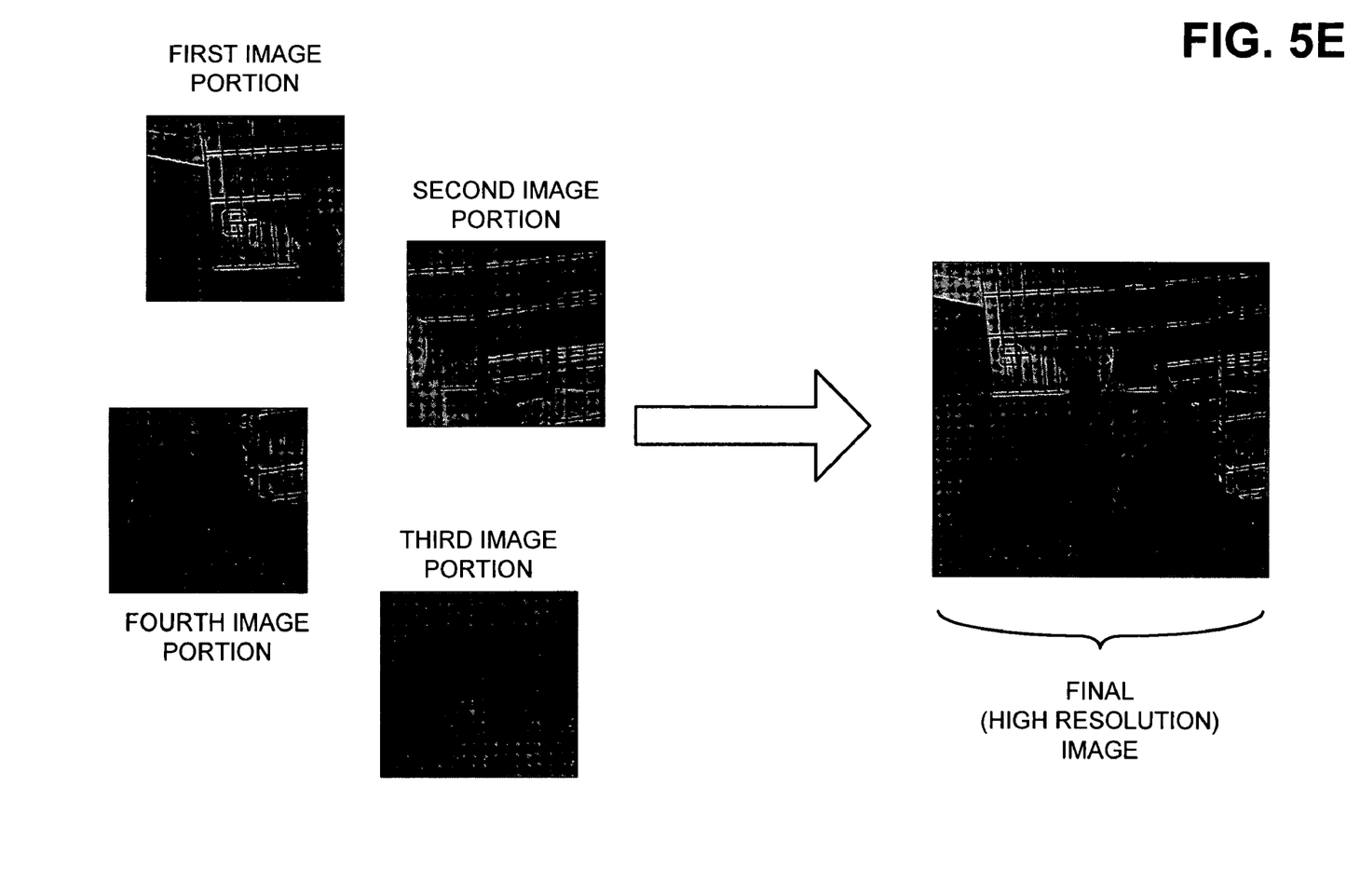

After each of the image portions has been captured, the image portions may be sent to processing logic 250 for processing. Processing logic 250 may include software that combines the image portions to obtain a final image (block 450). For example, processing logic 250 may match the edges of the image portions to detect the overlapping sections. Processing logic 250 may remove the overlapping sections, as necessary, and merge the image portions to form a high resolution image, as shown in FIG. 5E. Processing logic 250 may then store the final image and/or present the final image on a display associated with camera device 100 (not shown).

ALTERNATIVE IMPLEMENTATION

It has been described above that a sensor may be moved to capture images of different portions of a projected image. In an alternative implementation, the sensor may be held stationary and the optics may be moved to permit the sensor to capture images of different portions of a field of view.

Figure 6:
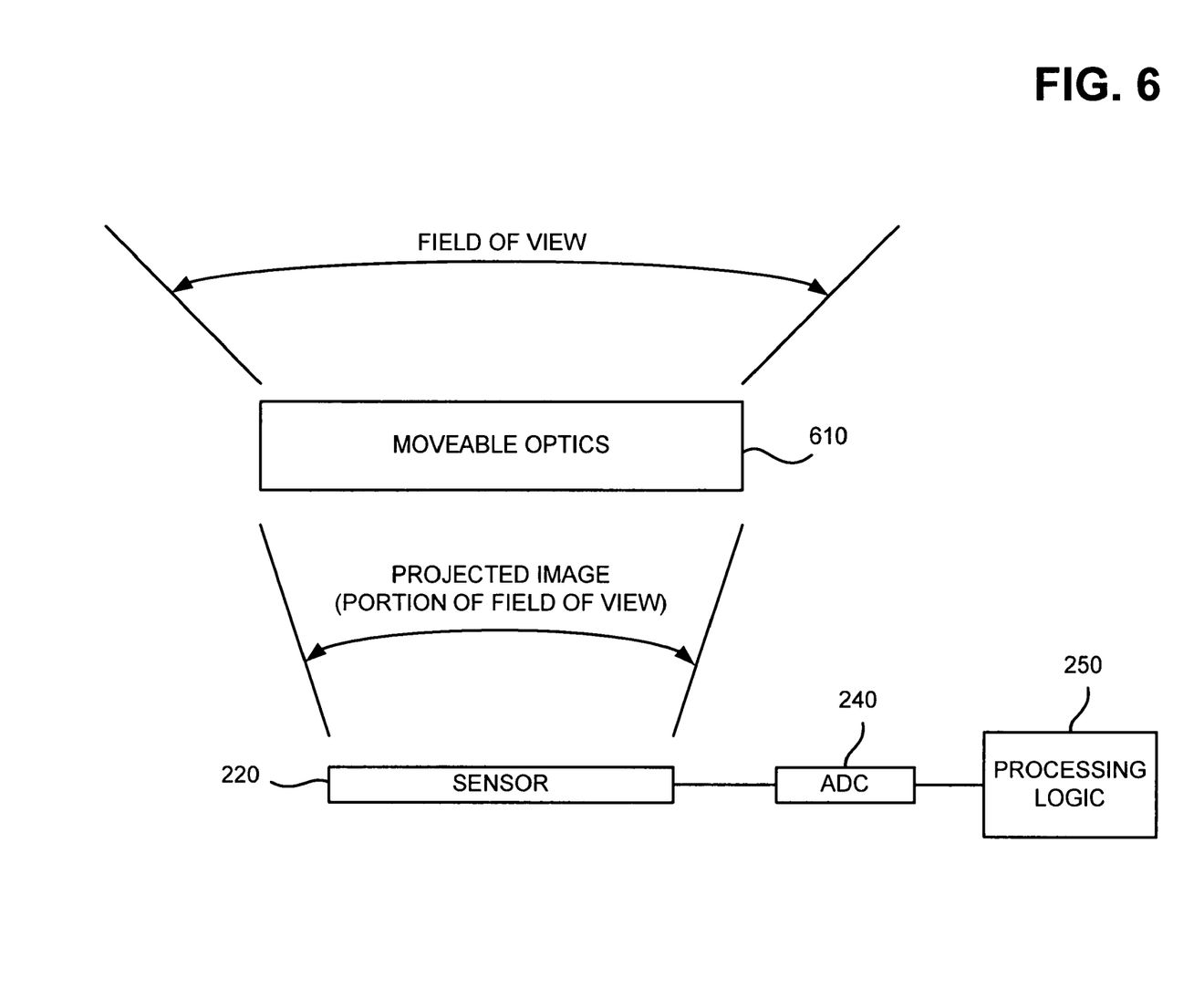
FIG. 6 is an alternate exemplary diagram of some of the components of the camera device of FIG. 1.

FIG. 6 is an alternate exemplary diagram of some of the components of camera device 100. As shown in FIG. 6, camera device 100 may include moveable optics 610, sensor 220, ADC 240, and processing logic 250. Sensor 220, ADC 240, and processing logic 250 may be similar to those like components described above with regard to FIG. 2. In this case, however, sensor 220 is a stationary sensor instead of a moveable sensor.

Moveable optics 610 may include lens elements similar to optics 210. Moveable optics 610 may also include additional lens elements, such as a mirror, prism, or the like, to obtain light from a field of view and focus a portion of the field of view as a projected image. In this implementation, the projected image may be approximately the same size as sensor 220.

Moveable optics 610 may also include a movement mechanism to move one or more of the lens elements so that different portions of the field of view may be focused on sensor 220. In one implementation, the movement mechanism may include a piezoelectric linear actuator or another type of micro mechanics that is small in size and capable of moving the one or more lens elements at fast speeds.

Figure 7:
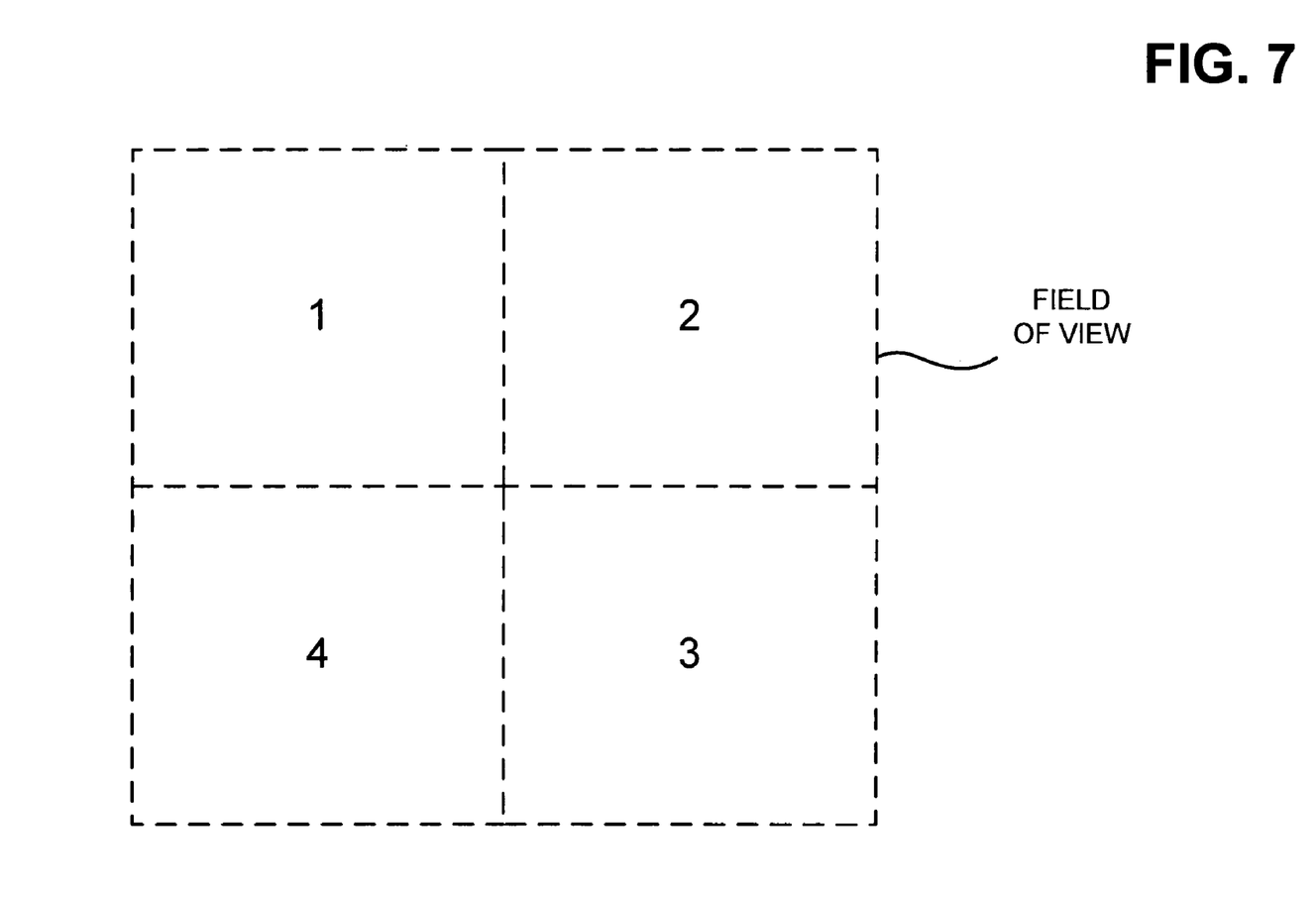
FIG. 7 is a diagram of how an exemplary field of view may be divided into different portions.

In this alternate implementation, camera device 100 may operate similar to that described above with regard to FIG. 4 except that instead of moving sensor 210, optics 610 may be moved to focus different portions of the field of view on sensor 210. FIG. 7 is a diagram of how an exemplary field of view may be divided into different portions. Optics 610 may be moved to individually focus portions 1-4 of the field of view on sensor 220. Sensor 220 may capture each of the images, which may then be combined by processing logic 250, as explained above.

CONCLUSION

Implementations consistent with the principles of the invention may produce a high resolution image using a small sensor with fewer pixels compared to the produced image (i.e., the sensor may be of low resolution compared to the high resolution image that is produced). By using a small sensor, sensor production yield may increase. Also, a smaller piece of silicon may be needed for the sensor, thereby lowering the price of the camera, while still keeping a high multi-mega pixel resolution.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 4, the order of the acts may be modified in other implementations consistent with the principles of the invention. Further, non-dependent acts may be performed in parallel.

Implementations have been described in which a sensor is moved or one or more lens elements are moved to permit an image to be captured. In another implementation, it may be beneficial to move both the sensor and one or more lens elements. For example, the sensor may be configured to move only in the x-direction and the one or more lens elements can be configured to move the projected image in the y-direction, or vise versa.

Further, while a camera device with a single sensor has been described above, it may be possible to include multiple small sensors (of low resolution) that may act alone or in concert to capture image data.

It should be emphasized that the term "comprises" or "comprising" when used in the specification is taken to specify the presence of stated features, integers, steps, or components but does not preclude the presence or addition of one or more other features, integers, steps, components, or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A camera device, comprising:
   optics configured to produce a projected image; a piezoelectric linear actuator configured to move the optics to project a plurality of different portions of the projected image at each of a plurality of locations; a moveable sensor with a first number of pixels, the sensor is to: move to the plurality of locations, where the sensor and the optics move independently of each other, and capture the plurality of different portions of the projected image at each of the plurality of locations; and
   processing logic configured to combine the captured portions into an image that contains a second number of pixels at least two times greater than the first number of pixels.

2. The camera device of claim 1, further comprising:
   a movement mechanism to move the sensor to the plurality of locations.

3. The camera device of claim 2, where the movement mechanism includes a piezoelectric actuator.

4. The camera device of claim 1, where a size of the sensor is smaller than a size of the projected image.

5. The camera device of claim 1, where each of the captured portions overlaps with another one of the captured portions.

6. A camera device, comprising:
   optics to:
   produce a projected image, and move to project a plurality of different portions of the projected image at a plurality of locations; a moveable sensor to:
   move to the plurality of locations, and
   capture a plurality of portions of the projected image, as a plurality of image portions, at each of the plurality of locations,
   where, when the sensor is positioned at each of the plurality of locations, a piezoelectric linear actuator moves the optics to project the plurality of different portions of the projected image on the sensor, and where the sensor and the optics move independently of each other; and processing logic to combine the image portions together into a final image.

7. The camera device of claim 6, where a number of pixels associated with the sensor is less than a number of pixels associated with the final image.

8. The camera device of claim 6, further comprising:
   a movement mechanism to move the sensor to each of the plurality of locations.

9. The camera device of claim 8, where the movement mechanism includes a piezoelectric actuator.

10. The camera device of claim 6, where each of the image portions overlaps with another one of the image portions.

11. The camera device of claim 6, wherein the first dimension is an x-direction and the second dimension is a y-direction.

12. A camera device, comprising: a plurality of lens elements to project an image associated with a field of view; a sensor to capture a plurality of sub-images associated with the field of view by moving one or more lens elements of the plurality of lens elements and by moving the sensor, where the sensor captures multiple ones of the plurality of sub-images in each of a plurality of positions to which the sensor moves, and where the sensor and the one or more lens elements move independently of each other; and
   a movement mechanism configured to move the one or more lens elements in a plurality of directions in multiple dimensions, wherein the movement mechanism includes a piezoelectric linear actuator; and
   processing logic to combine the sub-images to obtain a final image associated with the field of view.

13. The camera device of claim 12, where a number of pixels on the sensor is at least two times less than a number of pixels associated with the final image.

14. The camera device of claim 12, where the sensor includes a plurality of sensors.

15. A method performed by a camera device that includes a plurality of lens elements and a sensor, comprising: using a piezoelectric linear actuator to move one or more of the plurality of lens elements to cause multiple different portions of a field of view to be focused at each of a plurality of locations;
   moving the sensor to each of the plurality of locations, where the sensor and the one or more of the plurality of lens elements move independently of each other;
   capturing, by the sensor, the multiple different portions of the field of view at each of the plurality of locations to produce multiple sub-images; and
   combining the sub-images into a final image.

16. A camera device, comprising: means for projecting an image;
   a piezoelectric linear actuator to move a lens element to project a plurality of different portions of the image onto a sensor;
   means for moving the sensor to a plurality of locations, where the sensor and the lens element move independently of each other;
   means for capturing, by the sensor, a plurality of the different portions of the projected image, as image portions, in each of the plurality of locations; and
   means for merging the image portions into a final image.

17. The camera device of claim 16, where a number of pixels on the sensor is at least two times less than a number of pixels associated with the final image.

18. The method of claim 15, where combining the sub-images into a final image includes:
   matching edges of the sub-images to detect overlapping sections;
   removing the overlapping sections, and
   merging the sub-images with the removed overlapping sections to form the final image.

* * * * *

UNITED STATES PATENT AND TRADEMARK OFFICE
CERTIFICATE OF CORRECTION

| | | |
|---|---|---|
| PATENT NO. | : 8,072,502 B2 | Page 1 of 1 |
| APPLICATION NO. | : 11/298584 | |
| DATED | : December 6, 2011 | |
| INVENTOR(S) | : Stip Martin Grip et al. | |

It is certified that error appears in the above-identified patent and that said Letters Patent is hereby corrected as shown below:

In claim 6, column 7, line 37, add "and wherein the sensor is to move to the plurality of locations in a first dimension and the optics are to move the projected image in a second dimension that is different than the first dimension;" after "move independently of each other."

In claim 12, column 8, line 7, delete the word "and."

In claim 16, column 8, line 34, add the word "configured" after the line "a piezoelectric linear actuator."

Signed and Sealed this
Twentieth Day of March, 2012

David J. Kappos
*Director of the United States Patent and Trademark Office*